July 30, 1968    C. R. BRUCE ET AL    3,395,193
PYROLYSIS GAS PURIFICATION APPARATUS AND PROCESS
Filed April 26, 1966
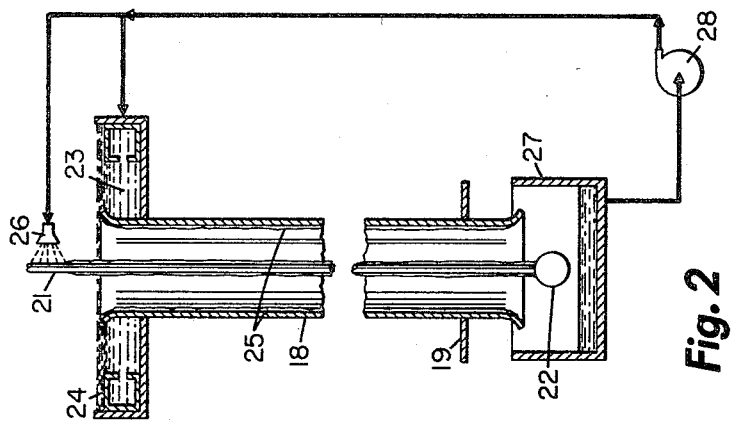
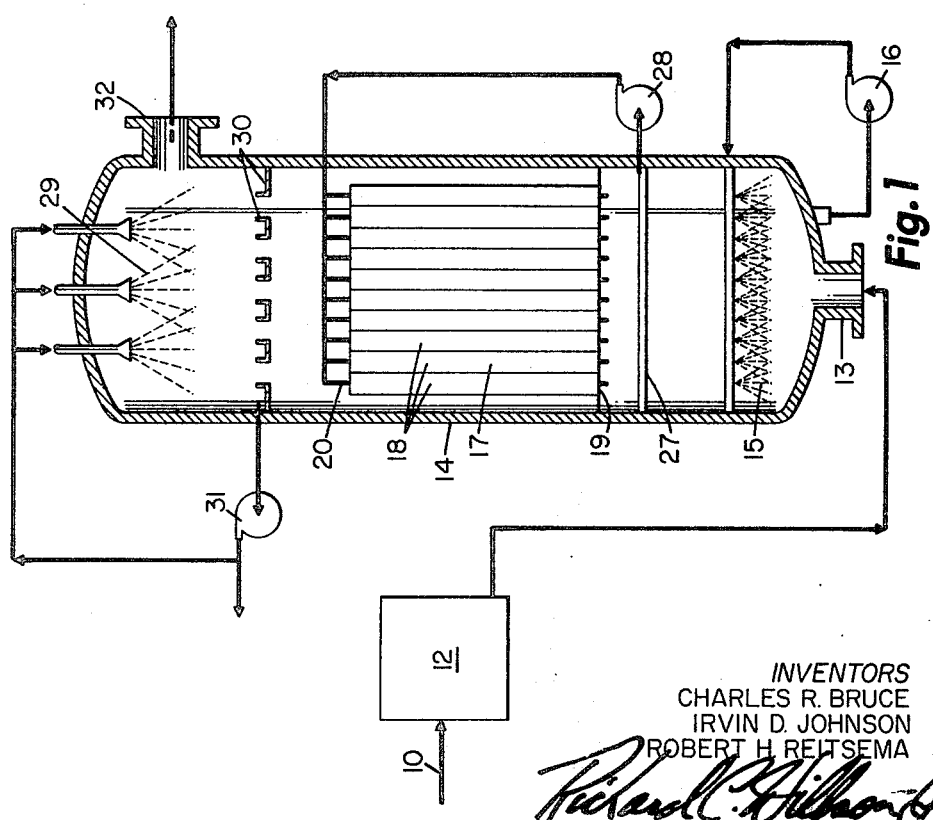
INVENTORS
CHARLES R. BRUCE
IRVIN D. JOHNSON
ROBERT H. REITSEMA
ATTORNEY

United States Patent Office 3,395,193
Patented July 30, 1968

3,395,193
PYROLYSIS GAS PURIFICATION APPARATUS AND PROCESS
Charles R. Bruce and Irvin D. Johnson, Littleton, Colo., and Robert H. Reitsema, Findlay, Ohio, assignors to Marathon Oil Company, Findlay, Ohio, a corporation of Ohio
Filed Apr. 26, 1966, Ser. No. 545,452
14 Claims. (Cl. 260—679)

ABSTRACT OF THE DISCLOSURE

The present invention comprises a process for the pyrolysis of hydrocarbons comprising vaporizing the hydrocarbons, subjecting them to pyrolysis in the vapor state, then removing a major portion of solid materials and viscous materials from the pyrolyzed gas stream by subjecting the gas stream to an ionizing electrical discharge from an electrode and passing the gas stream past a collector electrode of opposite electrical polarity from said electrical discharge electrode while maintaining on the active surface of at least one of the electrodes a flowing film of a non-aqueous carbon wetting liquid.

---

The present invention relates to new processes for the pyrolysis and subsequent purification of hydrocarbons and in particular relates to electrostatic methods for the purification of gas streams obtained from pyrolysis reactions.

Processes for thermally cracking hydrocarbons into acetylene, ethylene, and other gases have been described at length in the literature. (See for example, the Wulff process described in U.S. Patents 2,037,056; 2,236,534; 2,236,535; 2,236,555; 2,319,679; 2,518,688; and 1,983,-992.)

Most such pyrolysis processes provide effluent streams which contain significant amounts of solid carbon in the form of relatively fine entrained particles, e.g., roughly in the 1-2 micron range in most processes. In addition, such effluent gas streams frequently contain mists of liquid hydrocarbons entrained by the gas stream and also entrained droplets of tarry viscous materials which are characteristic of most pyrolysis processes and particularly of the above-mentioned Wulff process.

In order to prevent the contamination of downstream purification systems, e.g., distillation columns, it is important that such carbon and tarry materials be removed or at least very substantially reduced at an early point in the system downstream from the pyrolysis furnace. Particularly, in the Wulff process, the separation of the effluent comprising acetylene and ethylene requires relatively complex selective absorption and stripping sections and maintenance in removing tar deposits from this equipment can present a significant problem.

Current markets for petroleum products have made it economically expedient to utilize the Wulff process with much higher boiling feedstocks than the gaseous hydrocarbons commonly employed. These new feedstocks, primarily heavy naphthas having boiling ranges of approximately 200–400° F., form substantially greater amounts of deposits. Further, these deposits, while originally soft, solidify with time into relatively hard material which is highly difficult to remove from equipment.

In past commercial installations, the possibility of formation of such tarry deposits on electrostatic precipitation equipment has caused the use of alternative purification methods for removing carbon from the gas stream in commercial processes. These alternate methods have included oil quenches and water quenches sometimes followed by water washes, e.g., in sprays, packed columns, or cascade-type tray columns. However, water, in conjunction with the carbon and the tars and oils which are collected from the pyrolysis gas stream, forms emulsions which are often exceedingly difficult to break and which require as a minimum, either additional processing steps or special disposal facilities. Washing trays, e.g., of the cascade type, pose significant problems by increasing the back pressure which is relatively critical in pyrolysis processes, particularly those carried out at subatmospheric pressures. In many such processes, an increase in back pressure causes the formation of additional amounts of carbon in the gas stream which in turn requires additional washing equipment which again increases the back pressure. This cyclic interrelationship can severely affect the economics of pyrolysis processes where back pressures become excessive, particularly when relatively heavy feedstocks are employed. In addition, of course, power requirements for compressors are increased by the pressure drop through the purification section.

The present invention by the use of a combination of electrostatic precipitation combined with continuous flushing of the electrostatic precipitator electrodes by a non-aqueous carbon-wetting liquid provides highly effective removal of impurities from the gas stream together with pressure drops which are much lower than those encountered with washing trays or packed columns. The present invention has, in fact, operated with less than ½ inch of pressure drop across the electrostatic precipitation purification section. The flushing with a nonaqueous carbon-wetting liquid effectively prevents the fouling of electrodes by the tarry materials which are present in most pyrolysis effluents and, in addition, avoids the formation of the troublesome emulsions previously encountered.

It has been discovered that, by maintaining the process gases above their water dew point during the process, the formation of the above-discussed undesirable emulsions can be virtually eliminated, even where heavy feedstocks are pyrolyzed.

In addition to carbon particles, the present process relatively efficiently removes the tarry products and also the hydrocarbon mists which form in the effluent gases. By the removal of these nonsolid contaminants, the present invention permits the downstream facilities to operate efficiently, without excessive contamination.

Further, it has been discovered that after electrostatic removal of the major portion of the solid carbon materials, a downstream water quench may be utilized without the formation of the extremely difficult to break emulsions which otherwise form when the carbon particles are mixed with condensed hydrocarbon and water from water sprays.

FIGURE 1 is a schematic drawing of a preferred embodiment of the present invention and FIGURE 2 is a schematic illustration of the details of one of the electrostatic precipitator sections from FIGURE 1.

In FIGURE 1, heavy naphthas 10 preferably having boiling ranges of from about 200 to 400° F. are fed to a pyrolysis-type furnace 12 such as that described in one of the above-mentioned United States patents. The furnace preferably operates at a temperature of about 2,500° F. with a contact time of about 0.01 to 1.0 second. The exhaust gases are cooled before leaving the furnace to temperatures of about 900° F. Exhaust gases then enter the lower inlet 13 of the tower 14 and are immediately cooled by passing through an oil spray 15 consisting of light catalytic cycle oil or other oil having a viscosity of preferably about 0.5 to about 50 centipoises under room temperature. This cooling oil is preferably collected at the bottom of the tower and recycled by means of pump 16.

The effluent gases from the oil quench section, now having a temperature of from about 200 to about 400° F., next enter the electrostatic precipitation section 17.

This consists of a tightly packed bundle of approximately 6-inch internal diameter steel tubes 18 which are connected to a header 19 which causes the exhaust gases to flow through the tubes.

As shown in FIGURE 2, each of the tubes 18 has an electrode 21 consisting of an approximately 0.1 inch diameter steel rod running down the longitudinal section of the tube. A weighted fixture 22 holds the electrode taut and stationary in the tube.

An oil header 20 contains several inches of oil 23 which flows through an individual distributor 24 mounted on the tube, forming a thin uniform film 25 as the oil flows down the interior of the tube. A coarse spray of the same oil 26 coats the exterior of the electrode 21 and flows in a thin film down the surface of the electrode. Pans 27 collect the oil at the bottom of the tube and electrode and a pump 28 recycles the oil.

Electrical contact between the central electrode and the tube is, of course, avoided. The electrode is negatively or positively charged and creates an ionizing electrical discharge in the annular space between the electrode and the tube. The potential between the electrode and the tube will necessarily vary with the composition of the gases, their flow rate, particulate loading, pressure, and the geometry of the apparatus. Although no sparkling is necessary, in general the potential will preferably be sufficiently close to the breakdown voltage of the system to cause one-half to four sparks per second. Usually the voltage will be in the general range of from 500 to about 30,000 volts per inch average gradient in the space between the electrode and the tube with voltages of 5,000 to about 15,000 volts per inch being more preferred.

As the gases flow past the electrode 18, the solid particles of carbon, the oil mist entrained in the gases, and the condensed and entrained tarry materials are charged negatively.

The negatively charged particles are then drawn toward the positively charged collector electrode (the tube 18). As the charged particles touch the oil film, they are entrained and flushed downward toward the bottom of the tube and become incorporated in the oil in the pans 27. A portion of this oil may be bled off and filtered or otherwise purified to permit recovery of the fine carbon for use as fillers in polymeric compositions.

Similarly, the tarry materials may be separated from the oil and recovered if desired.

The efficiency of removal of carbon particles can be well over 90% even where the carbon particles are as fine as 1–2 microns in average diameter. Removal rates of 99.9% or better are possible under optimum conditions.

The effluent gases, now greatly reduced in carbon content, leave the electrostatic precipitation section 17 and move to the top of the tower where they encounter water sprays 29 which further cool the gases and scrub out condensed liquids. It is an important advantage of the present invention that, because of the removal of a major portion of the original carbon contamination prior to the contacting of the effluent gases with water, the extremely difficult to break carbon-oil-water emulsions are not formed when the exhaust gases are contacted by the water sprays 29. The mixture of water and condensed materials drops down into collector 30 which is fitted with suitable bubble caps or weirs to permit the upflow of gases while preventing the downflow of water. A pump 31 removes this mixture from the collector 30 and recycles a portion of it to the water sprays 29. A further portion of this water-condensed materials mixture may be separated, e.g., by decantation or other conventional means. Makeup water is, of course, provided as necessary.

The water-washed gases leave the tower through outlet 32 and continue to move downstream through various purification and separation processes, e.g., partial condensation, selective absorption or adsorption, etc., as necessary to purify them and separate them for their various end uses.

It will be apparent that the above-described process is merely exemplary and is subject to a wide variety of modifications and variations. For example, the configuration of the electrostatic precipitators may be changed to parallel plates or other known electrostatic precipitator configurations which are adaptable to the creation of a flowing oil film.

Where the concentric configuration shown in FIGURES 1 and 2 is employed, the preferred diameters of the center electrode will be from about 0.01 to about 1.0, more preferably from 0.05 to about 0.5 and most preferably from 0.1 to about 0.6 inch. The spacing between the negative and positively charged electrodes will be from about 0.5 to 20, more preferably from 1 to about 10 and most preferably from 2 to about 5 inches. The length of the tubes will generally fall in the range of from about 5 to about 30 feet with lengths of 6 to 15 feet being desirable under most circumstances. Various techniques well known to the electrostatic precipitator art such as the placement of one set of tubes over another to permit the gas to be contacted successively by two or more independent electrostatic precipitation units can be employed. Preferably the exterior conduit is so constructed as to be capable of withstanding external pressure.

Temperature is not narrowly critical but will preferably be in the range from the $H_2O$ dew point of the gas stream to about 1,200° F., with ranges of 200 to about 600° F. being more preferred and 250 to 450° F. being optimum for most applications.

Similarly, pressure is not narrowly critical during the process of the present invention, although the pressure maintained in the pyrolysis furnace may be important to the compositions of gases which are obtained. In the electrostatic precipitation section, a pressure of from about 0.1 to about 100 atmospheres, more preferably from 0.2 to about 1 atmosphere, will be maintained. For the Wulff process, the pressure will generally be approximately 0.5 atmosphere. In the Wulff process, a compressor located downstream, frequently near the end of the purification apparatus chain will provide the above-described subatmospheric pressures and the force for movement of gases through the tower and other apparatus. However, where elevated pressures are desirable in the pyrolysis furnace, the incoming gases 10 may be supplied at a sufficiently high pressure to cause the effluent gases to move through the tower and the other purification facilities.

Gas velocity through the precipitating section will preferably be from 1 to 100 and more preferably from about 15 to about 25 feet per second.

While the liquids used for the formation of the moving film on the electrodes of the electrostatic precipitator are not narrowly critical, they should, of course, have boiling points sufficiently high to prevent their full evaporation as they move downward under the conditions of the process. In addition, they should preferably be electrically nonconductive and should be compatible with the materials being removed from the gas stream. For many circumstances, light catalytic cycle oil principally composed of a mixture of various alkylnaphthalenes and having a boiling range of from about 400 to about 650 with viscosity of approximately 0.5 to 50 centipoises at room temperature will be especially preferred for the formation of the moving film.

Packing may be provided under either the water or oil quench sprays or both if it is desired to increase the contact area between the spray liquid and the gas stream.

The above and all of the many modifications and variations of the present invention which will be apparent to those skilled in the art from a reading of this specification are intended to be included in the claims appended hereto.

What is claimed is:

1. In a process for the pyrolysis of hydrocarbons by vaporizing said hydrocarbons and subjecting them to pyrolysis in the vapor state to produce a gas stream of significantly lower average molecular weight than said feed hydrocarbons wherein said gas stream is contaminated with substantial quantities of entrained solid and viscous materials the purification steps for removing a major portion of said solid materials and a substantial quantity of said viscous materials comprising:
  (a) Imparting an electrical charge to said solid and said viscous materials by subjecting said gas stream to an electrically ionizing electrical discharge,
  (b) Passing said gas stream containing said charged materials past a collector electrode of opposite electrical polarity from said electrical discharge electrode, and
  (c) Maintaining on the active surface of at least one of said electrodes a flowing film of a non-aqueous carbon-wetting liquid.

2. The process of claim 1 wherein an average electrical potential gradient of from about 500 to about 30,000 volts per inch of spacing between said collector and the electrode causing said ionizing discharge is maintained.

3. The process of claim 1 wherein a portion of the liquid forming said liquid film is collected at the bottom of the collector and recycled to flow back down over the collector.

4. The process of claim 1 wherein the electrical potential between said collector and said electrode producing the ionizing discharge is maintained sufficiently high to produce from about ½ to about 4 sparks per second.

5. The process of claim 1 wherein the feed material is a heavy naphtha and the effluent gases contain major quantities of acetylene and ethylene and wherein the carbon in the effluent gases is at a level of from about 0.01 to about 10 grains per cubic foot of effluent gases.

6. The process of claim 1 wherein the pyrolysis step is a Wulff process.

7. The process of claim 1 wherein the effluent gases pass through the electrostatic precipitation section at temperatures from the water dew point of said effluent gases to about 1,200° F. and where said effluent gases emerging from the electrostatic precipitation section are thereafter cooled by contacting with a water spray.

8. Apparatus for the production of relatively clean hydrocarbon pyrolysis gases comprising in combination a heating section wherein said hydrocarbons are pyrolyzed by heating, a compressor means for drawing said gas stream from said heating section, and electrostatic precipitation means located between said heating section and said compressor section, said electrostatic precipitation means comprising at least one electrical discharge electrode for ionizing solid particles contained in the effluent from said heating section and at least one collector electrode having an opposite electrical charge from said electrical discharge electrode and being in spaced relationship from said electrical discharge electrode, and means for maintaining a thin flowing film of substantially electrically nonconductive liquid moving over the surface of said collector electrode and the discharge electrode.

9. The apparatus of claim 8 wherein the film is a hydrocarbon.

10. The apparatus of claim 9 wherein the film consists essentially of a hydrocarbon having a viscosity of from about 0.5 to about 50 centipoises at room temperature.

11. An apparatus for the removal of solid particles from gas streams which contain entrained viscous materials comprising in combination an electrical discharge electrode for ionizing said particles and a collector electrode having an opposite electrical charge from said electrical discharge electrode and being in spaced relationship from said electrical discharge, means for maintaining a thin flowing film of nonaqueous carbon-wetting, substantially nonelectrically conductive liquid moving over the surface of said collector electrode, said electrodes forming an electrostatic precipitation zone which is located within a section of a conduit with the liquid film moving downward and a stream of gases moving through said conduit and wherein an upstream section of the conduit comprises an oil quench for cooling the gases which entered the tower and flow successively through the quench and the electrostatic section.

12. The apparatus of claim 11 wherein a section of the tower downstream from said electrostatic section comprises a water spray for further cooling of the gases.

13. The apparatus of claim 11 wherein the electrostatic section comprises a bundle of annular collector electrodes within each of which there is positioned a slender electrical discharge electrode which extends substantially along the entire longitudinal axis of the tube.

14. The process of claim 11 wherein the pressure in the electrostatic precipitation section is from about 0.2 to about 1 atmosphere.

References Cited

UNITED STATES PATENTS 1,888,022   11/1927   Wintermute et al. _____ 55—119

DELBERT E. GANTZ, *Primary Examiner.*

J. D. MYERS, *Assistant Examiner.*